June 12, 1956  P. G. CARPENTER  2,749,990
KICK-OFF FOR GAS-LIFT WELLS
Filed Oct. 23, 1951
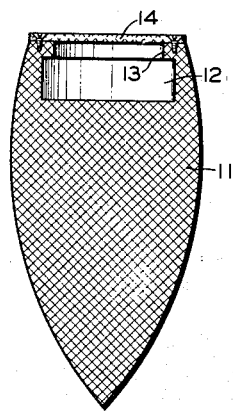
FIG. 1.
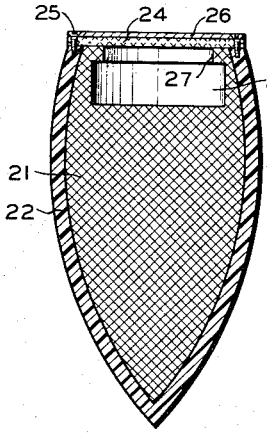
FIG. 2.
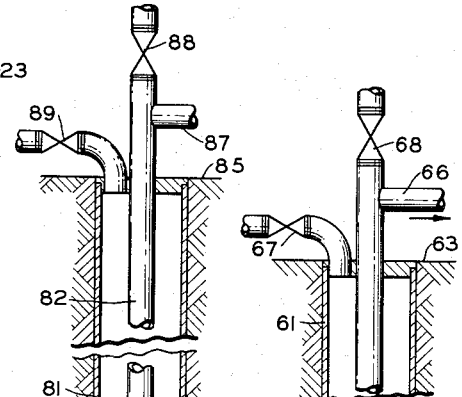
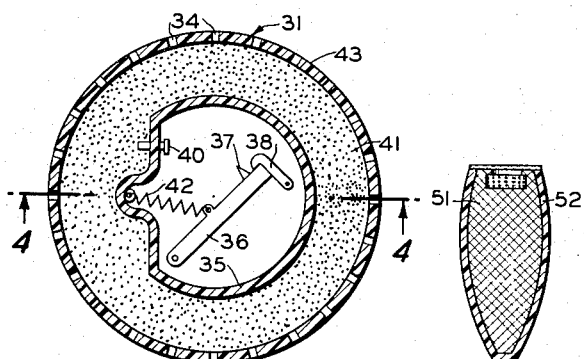
FIG. 3.
FIG. 4.
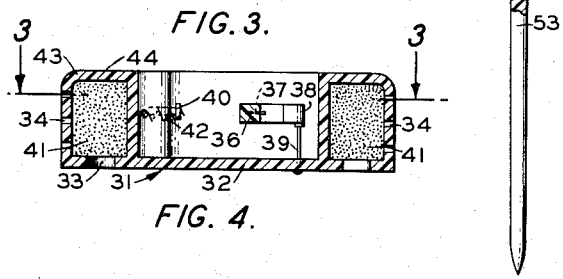
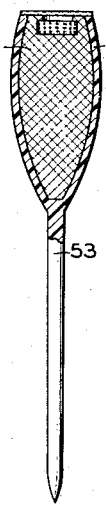
FIG. 5.
FIG. 7.
FIG. 6.
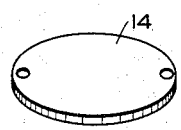
FIG. 8.
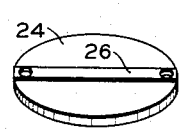
FIG. 9.
INVENTOR.
P. G. CARPENTER
BY
*Hudson & Young*
ATTORNEYS

United States Patent Office 2,749,990
Patented June 12, 1956

2,749,990

KICK-OFF FOR GAS-LIFT WELLS

Paul G. Carpenter, Bartlesville, Okla., assignor to Phillips Petroleum Company, a corporation of Delaware Application October 23, 1951, Serial No. 252,719

4 Claims. (Cl. 166—39)

This invention relates to starting oil flow in gas-lift oil wells. In one aspect this invention relates to the starting of oil flow in gas-lift oil wells in which for one or another reason the oil has ceased to flow naturally by the lifting effect of the production gas.

Oil wells termed gas-lift wells are generally considered those in which sufficient gaseous hydrocarbons are produced with the oil to lift the oil to the surface of the ground. Once a mixture of gas and oil starts flowing from the well if conditions are maintained properly the well may continue to flow for considerable periods of time. However many conditions may occur which cause the well to cease producing oil by the lifting action of its own production gas. When such wells cease to flow naturally many times flowing may again be started. One method of reestablishing the flow of oil is to lower a swab down the tubing string to a point near the point at which the oil enters the tubing, then raising the swab in a swabbing action to the well head. In this manner the swab in being raised up the well removes the dead weight of the column of oil from the producing formation and many times permits the reestablishment of the flow of gas and oil from the formation.

Occasionally it is only necessary to drop a solid object down the tubing to disturb the surface tension of the oil or the solubility of the gas in the oil. Sometimes this disturbing of the solubility of the gas is termed "breaking the interface." It is well known in every day life that when a liquid is saturated with a gas upon agitation of the liquid, or dropping a solid object into the liquid gas bubbles are evolved at once and in an oil well if a sufficiently large quantity of gas bubbles are evolved the entrance of a solid object into the oil may start the well to flowing of its own accord. Chemical methods may be used in evolving gases at the bottom of the well such as introduction of calcium carbide into the well. When the carbide reaches water in the bottom of the well acetylene gas is immediately formed and upon rising through the tubing may start the flowing of the well. Other chemicals or chemical combinations may be used as for example common baking soda and an acid. In this latter case a quantity of baking soda would need to be retained in one container and an acid in a second container and the two materials allowed to contact each other as they reach the bottom of the well. These materials of course liberate carbon dioxide gas. In case an acid is used it is of course advantageous to use an excess of the carbonate in order to consume the last traces of acid so that acid corrosion of the well equipment will not occur. Many other combinations of chemicals which evolve gases may be applied to such use.

I have devised a method entirely different from any known method for kicking off "dead wells." My method comprises introducing a bomb containing propellent material into the well through the tubing and after descending some distance through the oil a trigger mechanism operates to set off the propellent material the burning of which produces large quantities of gas and this gas being evolved below the surface of the oil lifts the oil upward and after sufficient gas has been evolved oil and gas are produced at the surface of the ground. When sufficient of the oil load has been removed from the well production gas and oil are again produced from the formation and normal production of the gas-lift well continues. Whenever in the future any condition occurs which prevents natural flow of gas from the well the well may again become "dead" and it may be necessary to use another bomb of this nature to reestablish flow.

One object of my invention is to provide a method for reestablishing oil and gas flow in an oil well in which the oil is normally produced by its own production gas. Another object of my invention is to provide an apparatus for use in reestablishing the flow of oil from such a well. Still another object of my invention is to devise an apparatus for introducing into the well, which apparatus may be triggered into operation below the surface of the oil and without electrical or other connection to the surface of the ground. Still other objects and advantages of my invention will be realized upon reading the following disclosure which taken with the attached drawing forms a part of this specification.

In the drawing Figure 1 is a sectional elevation in diagrammatic form of one form of apparatus of my invention. Figure 2 is a longitudinal sectional view in diagrammatic form of another embodiment of my invention. Figure 3 is a horizontal sectional view of a portion of the apparatus taken on the line 3—3 of Figure 4. Figure 4 is a vertical sectional view taken on the line 4—4 of Figure 3. Figure 5 is a longitudinal sectional view of another embodiment of my invention. Figure 6 is a longitudinal sectional view of an oil well illustrating the operation of my invention. Figure 7 is a longitudinal sectional view of an oil well illustrating the descent of the apparatus of my invention into the well. Figure 8 is a view in perspective of a portion of the apparatus of Figure 1. Figure 9 is a view in perspective of a portion of the apparatus of Figure 2.

Referring now to the drawing and specifically to Figure 1, element 11 is preferably a casting of a solid propellant material made into the form of a bomb or into other such form as will be satisfactory for the use herein disclosed. In order to be dropped into an oil well tubing string this bomb 11 should be cast into a form having a small diameter and a relative great length. The diameter of the bomb element will be determined more or less by the diameter of the tubing string down which the bomb must pass, and the length of the bomb will be determined more or less by the volume of gases it is necessary to evolve in order to reestablish the flow of oil. In the top of the bomb element 11 is provided an open space 12 above which is a rim 13. In this open space 12 during casting of the bomb there is inserted a triggering mechanism such as will be described below. In the embodiment of Figure 1 the solid propellant material is not encased in a case nor in any other cover other than possibly a layer of paper for protection purposes. A cover plate 14 is intended to fit tightly on the top of the bomb or between the rim 13 and the top of the trigger mechanism to prevent entrance of oil into the space 12 (trigger mechanism) at least for some little time after the bomb enters the column of oil.

In Figure 2 is illustrated an embodiment of my invention in which the solid propellant material 21 is encased in a protective jacket 22. This protective jacket 22 may be of substantial thickness in order to protect properly the propellent material from breakage or possibly from contact by the person handling the bomb. This case 22 is preferably made of a material which will burn in the well along with the solid propellant material so that no solid object of appreciable size will remain in the tubing.

This casing may be constructed of nitro-cellulose or other inflammable material of sufficient strength. In the embodiment of Figure 2 the bomb is also provided with an open space 23 for insertion of a triggering device to be described below. The upper portion of this bomb also contains a rim 27 upon which is placed a plate 24 of oil soluble or pressure breakable material for excluding oil or foreign matter from the space 23. A metal or strip of plastic material 26 may be placed across a portion of the top of the plate 24 and attached to the shell 22 by screws 25 embedded in the top rim of the shell to hold the plate in its proper relation to the rim 27.

In Figures 3 and 4 are illustrated respectively a plan section and an elevational section of my firing mechanism. In these figures it is seen that the firing mechanism 31 is composed of a circular base 32 having side walls 43 around the periphery of the base. A second vertical wall 35 is contained within the outer wall 43 in such a manner as to provide a more or less annular space between these two walls. This more or less annular space is covered on its top with the same material as that used in the construction of the base 32 and the several walls. This entire piece of apparatus 31 may be die cast from such a material as was mentioned above for the casing 22 of Figure 2, that is, a combustible material such as nitro-cellulose. However, depending upon conditions of construction the more or less annular plate 44 may be a separate piece and attached to the main portion of the element 31 by screws or other means of fastening, not shown. Around the annular space between the walls 35 and 43 are provided a number of openings 33 and 34. This annular space is filled with a combustible material such as black powder to serve as an ignition charge for igniting the main body of the bomb.

In the space within the inner wall 35 is the actual triggering mechanism. This mechanism consists of a pivoted arm 36 to which is attached a firing pin 37. This arm 36 is held in the position illustrated in Figure 3 by a latch element 38. To the arm 36 is attached a tension spring 42. A firing cap 40 is held tightly in the wall 35 in the position illustrated in Figure 3. The cap 40 is so positioned with respect to the firing pin 37 that upon release of the latch 38 the tension spring 42 rapidly pulls the firing pin 37 into sharp contact with the cap 40. This tension spring 42 exerts considerable pull on the arm 36 so that sufficient force is exerted upon release of the latch 38 that the pin 37 will cause the cap 40 to fire. This cap 40 may be a mercury fulminate cap or other such cap used in exploding of shells for blasting purposes. The latch 38 is held in the normal operating position by a pivot pin 39 around which the latch rotates as a center.

This latch element is one of the critical elements of my invention and it is constructed of such a material that it will dissolve or be substantially softened upon contact with oil in the well. It is intended that the firing mechanism be set off when oil is admitted to the cavity 12 of Figure 1 or the cavity 23 of Figure 2, each of which contains the firing mechanism of Figures 3 and 4 and softens the latch element 38 to such an extent that the tension spring 42 causes the firing pin 37 to impinge abruptly against the cap 40. When this action occurs the cap 40 fires, which firing in turn causes the firing or burning of the ignition charge 41, which burning in turn ignites the solid propellent material of the bomb through the openings 33 and 34. In other words flame and heat from the ignition charge pass through openings 33 and 34 to start the ignition of the solid propellent material. Upon burning of this solid propellent material large volumes of gases are given off and rise up the tubing in the well to aerate the dead column of oil which operation normally starts the well to flowing naturally.

The cover element 14 of Figure 1 and the cover element 24 of Figure 2 are composed of an oil soluble material. It is intended that these cover plates exclude the oil from the triggering mechanism during the descent of the bomb through the column of oil and permit the triggering mechanism to operate at such a time as a bomb approaches the bottom of the well.

These cover plates 14 and 24 in place of being made of an oil soluble material may be made of a material which will rupture or break by pressure of the oil column in the well. Where these cover plates rupture oil enters the triggering mechanism and starts its dissolving operation on the latch 38 and very soon then the firing mechanism is set into operation. If the cover plates are of oil soluble material the bombs will usually not be set off until they approach the bottom of the well.

In Figure 5 is illustrated a bomb on the bottom of which is attached a peg 53 for holding the bomb proper some little distance above the bottom of the well. Frequent times the tubing of a well through which the oil is produced does not extend entirely to the bottom of the well and this peg 53 is intended to be of such length as will hold the solid propellent bomb within the tubing. In Figure 7 of the drawing is illustrated a well in which a bomb of this type is being lowered through the tubing. When this bomb 83 reaches the bottom of the well 91 the peg will rest against the bottom 91 and will hold the propellent charge material within the end of the tubing 90. In this figure the bomb 83 is illustrated as nearing the surface of the oil 86, the surface of the oil within the tubing 84 and outside the tubing being at the same level. In Figure 7 reference numeral 81 identifies the well casing, to the top of which is attached a well head pipe containing the valve 89. The tubing 82 of this well is provided with a valve 88 through which the bomb 83 is introduced. The top of the tubing is also provided with a side tube 87 through which the well production is passed for such disposal as desired. Reference numeral 85 identifies the surface of the ground.

Figure 6 illustrates a second embodiment of a well of which the tubing 62 is positioned within casing 61, the later being provided with a well head tube containing a valve 67. The tubing is provided with a valve 68 through which a bomb 64 is introduced. A side tube 66 through which the oil and gas production is removed from the well is attached to the tubing at a point just below valve 68. The ground level is identified by reference numeral 63. As illustrated in Figure 6 it is intended that the bomb 64 is in operation and is evolving gases at a rapid rate and these gases 65 are illustrated as rising up the tubing carrying oil along with them.

The covers 14 and 24 of Figures 1 and 2 respectively, may be made of such oil-soluble material as a paraffin wax or such other oil-soluble material as will disintegrate in a relatively short time after contact with the oil. The latch element 38 as mentioned above may be constructed of rubber or a rubbery material of such hardness as will tightly hold the trigger arm 36 against the bias of the tension spring 42 until such time that this latch is softened by the solvent action of the oil.

In the construction of these kick-off bombs it is intended that the priming assembly case 31 be included in the space 12 of Figure 1 and space 23 of Figure 2 at the time these solid propellent bombs are cast. At such times of course the ignition charge case 32 will not necessarily contain the ignition charge 41 nor the mechanical parts of the firing apparatus which may be inserted in their proper positions at any time after the bombs are cast. It is preferable that during periods of storage of these bombs prior to their use that the firing arm 36 be released from the latch 38 and the firing pin rest against the cap 40 under the influence of some uniform bias from the spring 42. When it is desired to use a bomb then in preparing it for use it is merely necessary to move the firing arm 36 against the bias of the spring 42 and hook the latch 38 into the position illustrated in Figure 3. This apparatus is then cocked and is ready for firing at any time upon release of the latch 38. The wax cover 14 is then placed on the rim 13 and may be held in place by screws as illustrated by Figure 2 or by a plate 26 also illustrated in Figure 2. Or if desired the wax cover 14 may be softened around its edges by heat and then quickly placed upon the bomb and pressed firmly into contact therewith so that upon cooling the wax will adhere tightly to the rim 13 so as to make an oil-tight seal between the plate 14 and the firing mechanism within the space 12. This plate 14 needs to seal the firing mechanism against the presence of oil only for such a period of time as required to carry the bomb to the well and to drop the bomb through the valve 68 and until the bomb reaches a point at or near the well bottom. Then at any time it is satisfactory for the firing mechanism to operate.

The solid propellant materials which may be used in constructing the bombs of my invention are such materials as nitrocellulose and nitroglycerine, hydrazine nitrate, polysulfides, ammonium perchlorate, ammonium picrate-potassium nitrate, beryllium borohydride, lithium borohydride and lithium hydride.

In one embodiment of my invention the propellant materials may be liquid concentrated solutions of hydrogen peroxide or nitromethane. When single liquid propellants are used these may be termed monopropellants. When nitromethane is used it may be ignited by an ignition apparatus such as hereinbefore described. When concentrated solutions of hydrogen peroxide are used decomposition in my bomb apparatus is not one of combustion for evolving of gas but is merely the evolution of oxygen from the hydrogen peroxide. In this latter case just before lowering the bomb containing the hydrogen peroxide into the well a catalyst may be added to the peroxide to catalyze its decomposition into water and oxygen at such a time as the bomb might reach the bottom of the well. Liquid propellents may be used such as liquid oxygen and a liquid combustible material. If it is desired to use liquid hydrocarbons as fuel in such an operation it may be necessary only to introduce an oxidizing agent into the bottom of the well and this may be combined with a quantity of hydrocarbon in the well to produce the gas for kicking off the well. When liquid propellents are used it may be preferable to contain each of the liquids in separate containers and permit their mixing at such a time as the bomb reaches the bottom of the well.

The latch 38, which is hereinbefore disclosed as being made of an oil-soluble material, may also be made of a water-soluble material for use in a well in which there is appreciable water. By a water-soluble material I mean such a material as salt or sodium chloride molded or compressed in a form such as latch 38 of Figure 3. Other water-soluble materials such as copper sulfate sugar either compressed or in a candied form may be used.

While the above-described embodiments of the invention are given for illustrative purposes the invention obviously is not limited thereto.

I claim:

1. A method for starting a natural gas-lift flow of oil and gas in a production conduit disposed in a dead gas-lift oil well comprising introducing a kickoff bomb of combustible material into said production conduit and positioning said bomb at a point within said conduit adjacent and below the point of entry of oil and gas into said conduit, initiating combustion of said bustible material in said bomb by submerging said within the oil in said conduit whereby combustion evolved wholly within said conduit and said comb gas commingles with said oil and gas therein, flowi commingled oil and gas up said conduit and removi flowing oil and gas from the upper end portion ( conduit.

2. A method for starting a natural gas-lift flow and gas in a production conduit in a dead gas-lift c comprising introducing into a production conduit i dead gas-lift well a kickoff bomb of combustible m provided with a primer adapted to initiate combusl said combustible material upon submergence wi body of oil, positioning said kickoff bomb at a point said conduit, adjacent and below the point of en oil and natural gas into said conduit and submerged the level of oil in said conduit, whereby said ; initiates said combustion thereby producing comb gas, commingling the so-produced combustion ga the oil and natural gas in said production conduit wl the commingled oil and gases are lifted up the prod conduit and removing the so-lifted oil and gases fro upper end portion of said conduit.

3. A method for starting a natural gas-lift flow and gas in a production conduit in a dead gas-lift o comprising introducing into a production conduit i dead gas-lift oil well a substantially completely co ible kickoff bomb provided with a substantially com combustible primer, positioning said kickoff boml point within said conduit adjacent and below the p( entry of oil and natural gas into said conduit, and ini combustion of said bomb by further submerging below the level of oil in said conduit whereby comb gas is formed wholly within said conduit and said bustion gas commingles with oil and natural gas i conduit, flowing the commingled oil and gases u conduit and removing the flowing oil and gas ir from the upper end portion of said conduit.

4. A method for starting the flow of oil and ga: a dead gas-lift oil well comprising introducing a l bomb into a production conduit in said well and po ing said bomb at a point in said tubing below the s of liquid in said well and at a point adjacent and bel( point of entry of oil and gas into said production cc igniting and thereafter burning said bomb in said c and thereby producing combustion gases therein wl the combustion gas lifts oil upward in said condui removing a flowing oil and gas mixture from the well References Cited in the file of this patent

UNITED STATES PATENTS

| 1,104,011 | Snelling | July 24 |
| 1,473,348 | Howard | Nov. 6 |
| 1,511,488 | Alexander | Oct. 14 |
| 1,856,912 | Grebe et al. | May 3 |
| 1,920,637 | Doherty | Aug. 1 |
| 2,163,462 | Holran et al. | June 20 |
| 2,330,110 | Buchan | Sept. 21 |
| 2,390,770 | Barton et al. | Dec. 11 |